(12) United States Patent
Tell et al.

(10) Patent No.: US 11,879,537 B2
(45) Date of Patent: Jan. 23, 2024

(54) TRANSMISSION GEAR ASSEMBLY WITH A BREATHER CAVITY

(71) Applicant: Volvo Car Corporation, Gothenburg (SE)

(72) Inventors: Denise Tell, Gothenburg (SE); Emil Åberg, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 70 days.

(21) Appl. No.: 17/747,023

(22) Filed: May 18, 2022

(65) Prior Publication Data

US 2022/0373075 A1 Nov. 24, 2022

(30) Foreign Application Priority Data

May 21, 2021 (EP) .................................... 21175369

(51) Int. Cl.
*F16H 57/02* (2012.01)
*F16H 57/027* (2012.01)
*B60K 1/00* (2006.01)

(52) U.S. Cl.
CPC ............. *F16H 57/027* (2013.01); *B60K 1/00* (2013.01); *B60K 2001/001* (2013.01); *F16H 2057/02034* (2013.01); *F16H 2057/02043* (2013.01)

(58) Field of Classification Search
CPC ......... F16H 57/027; F16H 2057/02034; F16H 2057/02043; F16H 57/0452;
(Continued)

(56) References Cited

U.S. PATENT DOCUMENTS

| 2003/0098204 A1* | 5/2003 | Mogi | .................... F16H 57/027 184/6.23 |
| 2012/0217079 A1* | 8/2012 | Besler | ..................... B60B 35/16 403/361 |
| 2018/0180164 A1* | 6/2018 | Hagino | .................. B60K 6/445 |

FOREIGN PATENT DOCUMENTS

| JP | 2018146000 A | 9/2018 |
| WO | 2015011976 A1 | 1/2015 |

OTHER PUBLICATIONS

Aug. 16, 2021 European Search Report issued in Corresponding EP Application No. 21175369.

* cited by examiner

*Primary Examiner* — Timothy Hannon
*Assistant Examiner* — Farhana Pervin
(74) *Attorney, Agent, or Firm* — Clements Bernard Walker; Christopher L. Bernard

(57) ABSTRACT

A transmission gear assembly including a housing with an axial center line, having a front wall and a circumferential wall with a breather opening. The front wall includes an annular groove in fluid communication with the breather opening and covered by a substantially circular plate having a perimeter at a first distance (r) from the axial center line and with a predetermined length (L). On each transverse side in at least the lower part, an air/oil inlet and outlet is defined by a recess of the perimeter at a distance $(r_3, r_4)$ from the axial center line smaller than the first distance (r), each recess being in fluid communication with the annular groove. On each transverse side in the upper part, an air/oil inlet is formed by a recess of the perimeter at a distance $(r_1, r_2)$ from the axial center line smaller than the first distance (r) and having a circumferential length $(l_1, l_2)$ shorter than a circumferential length $(l_3, l_4)$ of the inlet/outlets.

12 Claims, 4 Drawing Sheets

(58) Field of Classification Search
CPC ............... F16H 57/0424; F16H 57/045; F16H 2057/02008; F16H 57/04; F16H 57/0412; F16H 57/0415; F16H 57/0416; F16H 57/0453; F16H 57/0482; B60K 1/00; B60K 2001/001
See application file for complete search history.

TRANSMISSION GEAR ASSEMBLY WITH A BREATHER CAVITY

CROSS-REFERENCE TO RELATED APPLICATION

The present disclosure claims the benefit of priority of co-pending European Patent Application No. 21175369.4, filed on May 21, 2021, and entitled "Transmission Gear Assembly With a Breather Cavity," the contents of which are incorporated in full by reference herein.

TECHNICAL FIELD

The present disclosure relates to a transmission gear assembly including a housing with an axial center line, the housing having a circumferential wall extending in an axial direction, an end wall at a motor side and a front wall at an output side, the end wall and the front wall extending in a radial direction, the walls defining an oil reservoir having an upper part and a lower part, an opening being provided in the end wall for receiving an input shaft, a gear system being rotatably mounted in the housing and connectable to the input shaft, an opening being provided in the front wall for receiving an output shaft that is connectable to the gear system, and a breather opening being provided in the circumferential wall.

The present disclosure also relates to an electric motor connected to such a transmission gear assembly and to an electric vehicle including an electric motor and connected transmission gear assembly.

BACKGROUND

In transmission gear assemblies, pressure builds up as a consequence of temperature variations. In the transmission gear housing, a breather opening is provided for pressure equalization with the ambient. Air can pass through the breather into and out of the transmission housing while contaminations are prevented from entering and oil is prevented from escaping from the transmission housing.

For a breather to properly function, a calm area in the oil reservoir is required, especially in the case of concentric planetary gears that are subject to a relatively high degree of oil splashing. In such a case there are no naturally calm areas of the housing to place the breather. Proper placement of a breather becomes more complex when considering, in the design, the factors of: the temperature range and resulting oil viscosity variations; the speed of rotation for forward and reverse driving and the G-forces caused by acceleration; uphill and downhill driving, breaking and turning.

It is known to provide ring-shaped channels in the oil reservoir of a transmission that are in fluid communication with a breather through a complex system of labyrinth passages that prevent oil from reaching the breather and escaping to ambient. These known constructions are of relatively large volume which makes it hard to package such a transmission gear assembly in a vehicle.

It is an object of the present disclosure to provide a transmission gear assembly in which the breather is effectively shielded from the oil in the reservoir while allowing a compact construction having a relatively large volume available for accommodating the gears. It is an aim of the present disclosure to provide a transmission gear assembly of a relatively simple design, reducing the number of parts and being suitable for a large variety of transmission gears with minor tuning. It is again an object of the present disclosure to provide a compact transmission gear assembly with a relatively large calm area.

SUMMARY

Hereto a transmission gear assembly according to the present disclosure has a front wall including an annular groove that is in fluid communication with the breather opening at an upper side of the front wall, the annular groove being covered by a substantially circular plate having a perimeter at a first distance from the axial center line and with a predetermined length L, the perimeter extending near the circumferential wall, with on each transverse side of the axial center line in at least the lower part an air/oil inlet and outlet defined by a recess of the perimeter at a distance from the axial center line that is smaller than the first distance, each recess having a circumferential length and being in fluid communication with the annular groove, and with on each transverse side of the center line in the upper part an air/oil inlet defined by a recess of the perimeter at a distance from the axial center line that is smaller than the first distance and having a circumferential length that is shorter than the circumferential length of the inlet/outlets.

The calm area of the oil in the reservoir according to the present disclosure is defined by the annular groove and the covering plate overlying the groove, with the peripheral air and oil apertures in the plate providing controlled flow and separation of oil and air. This results in a compact and stable breather design that works well for transmission gears, in particular co-axial or in line planetary transmission gears, of varying designs.

An embodiment of a transmission gear according to the present disclosure, includes an air distribution member having air inlet openings that are situated along the circumferential wall in the lower part.

The air inlet openings allow a controlled flow of air to travel to the front part of the housing defined by the circumferential wall and the front wall, and from there along the perimeter of the plate into the annular groove, and from there to the breather opening.

In a particular advantageous embodiment of a transmission gear assembly according to the present disclosure, a first inlet slot is situated with a midpoint at an angular position of between 35 and 55 (degrees and has a length $l_1$ between 1% and 5% of the length L of the perimeter, a second inlet slot is situated with a midpoint at an angular position of between 130 and 150 degrees and has a length $l_2$ between 1% and 5% of the length of the perimeter L, a first inlet/outlet slot is situated with a midpoint at an angular position of between 210 and 230 degrees and has a length $l_3$ between 10% and 25% of the length of the perimeter L, and a second inlet/outlet slot is situated with a midpoint at an angular position of between 305 and 325 degrees, and has a length $l_4$ between 5% and 20% of the length of the perimeter L.

DESCRIPTION OF EMBODIMENTS

Figure 1:
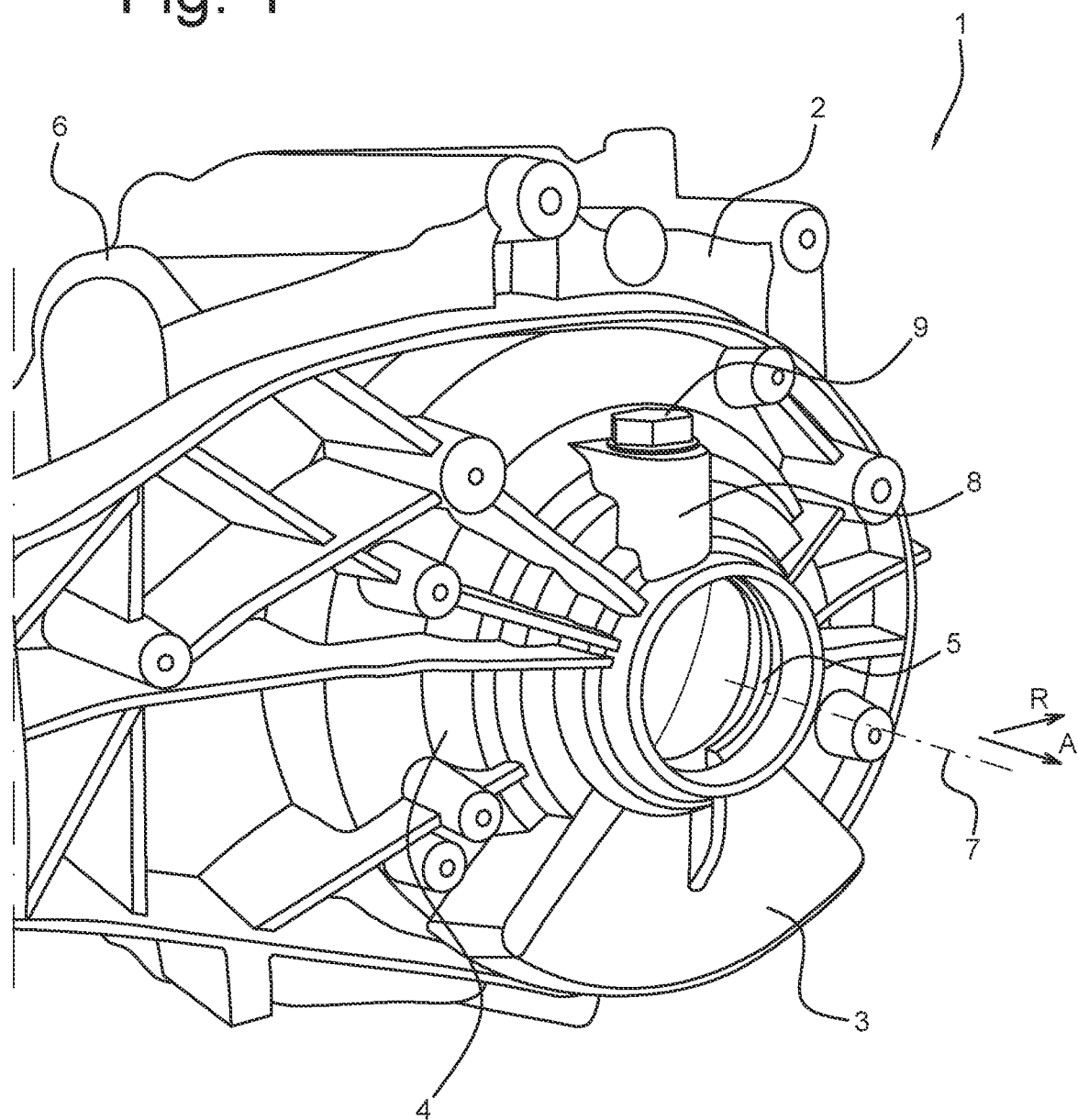
FIG. 1 shows an isometric view of the housing of a transmission gear assembly according to the present disclosure.

FIG. 1 shows an isometric view of a housing 2 of a gear assembly 1 with an axial center line 7. The housing has a front wall 3 and a circumferential wall 4. The front wall 3 extends in the radial direction R and is provided with an opening 5 through which a drive axle of a motor (not shown) can pass, the axle extending in the axial direction A. The motor is attached to the housing 2 at a motor side 6. The housing 2 includes a breather 8 that is closed by a cap 9. Through the breather 8, air can travel between the interior of the housing 2 and the ambient for pressure equalization, while its construction prevents oil from exiting from the gear assembly and dirt and water from entering.

Figure 2:
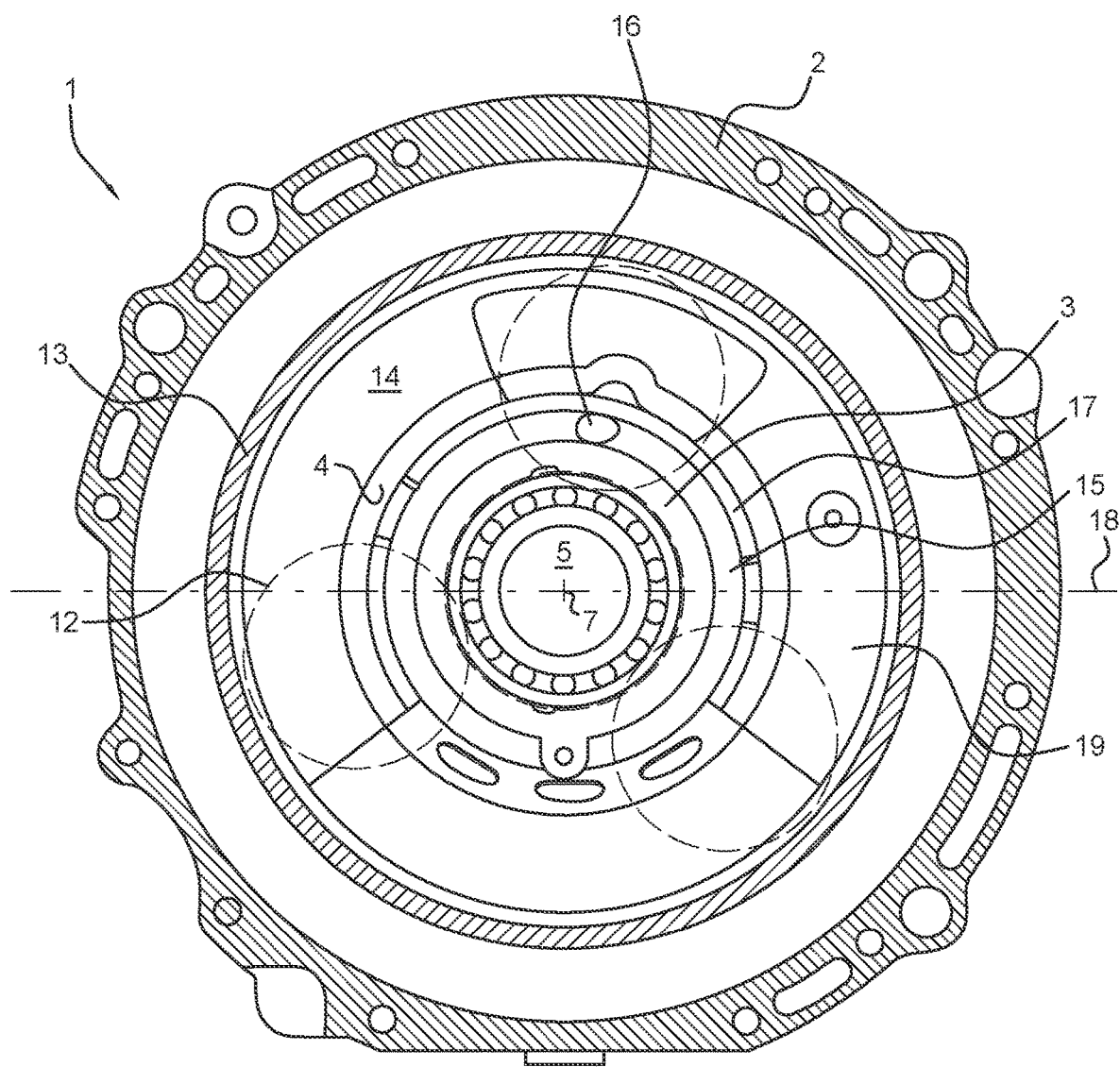
FIG. 2 shows a plan view of the housing according to the present disclosure form a motor side, with the plate removed.

FIG. 2 shows a plan view of the gear assembly 1 from the motor side 6, and shows with dotted lines the gears 12 of a planetary gear system. The housing 2 includes an inner wall 13 that can with its end face sealingly engage with a rear wall at the motor side 6 to form an oil reservoir 14 for the gears 12. At the front wall 3, an annular groove 15 is provided that forms an air channel that is in fluid communication with a breather opening 16. The breather opening 16 is provided in an upper part 17 of the oil reservoir 14, situated above the transverse center line 18.

Figure 3:
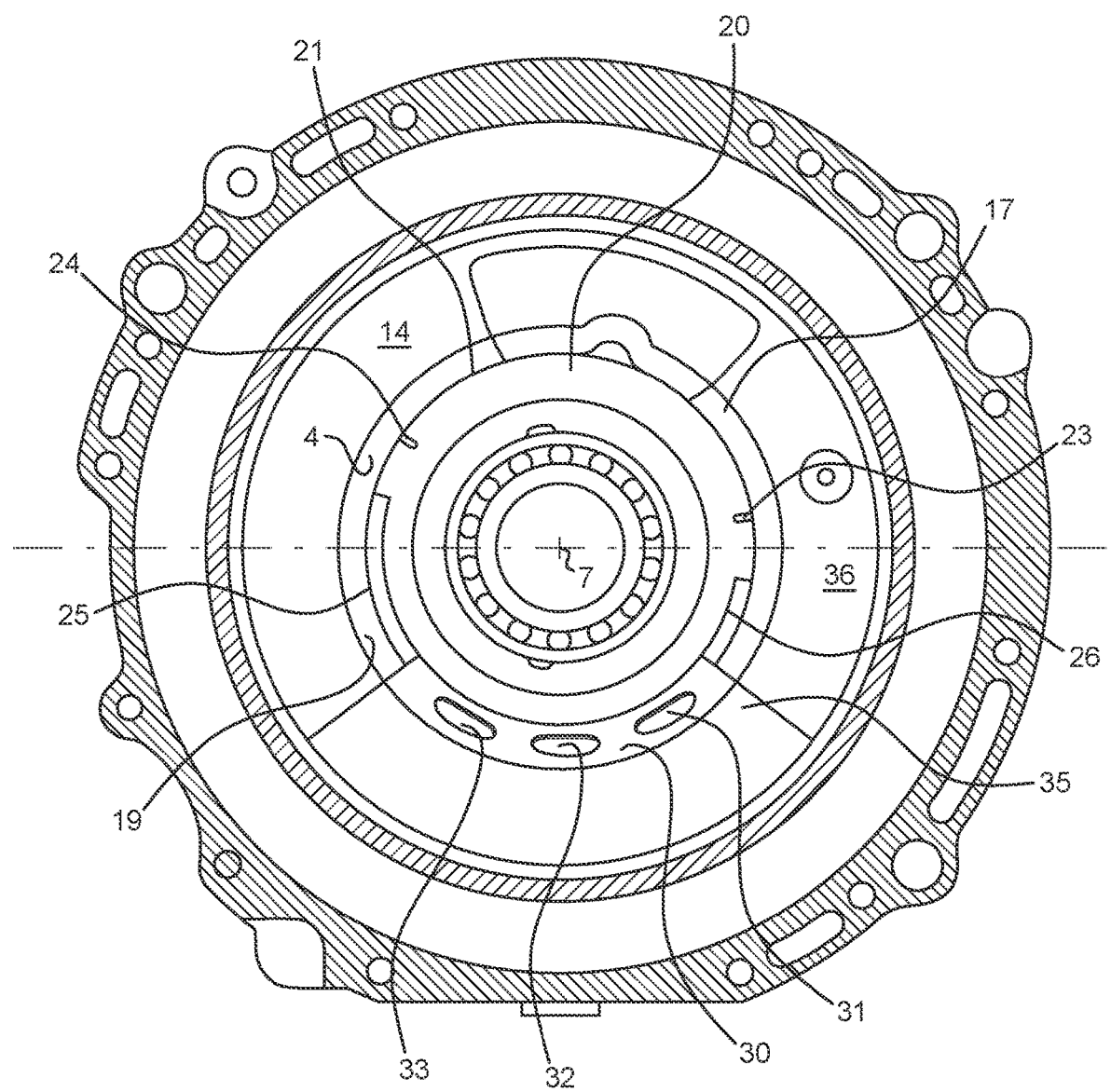
FIG. 3 shows the plan view of the housing of FIG. 2, with the plate installed.

FIG. 3 shows a plate 20 in the oil reservoir 14, covering the annular groove 15. The plate 20 is of generally circular shape and has a perimeter 21 that extends in close proximity to the circumferential wall 4. The plate has two air/oil inlets 23,24 in the upper part 17 of the oil reservoir 14, and two air/oil inlets and outlets 25, 26 in a lower part 19 of the oil reservoir 14, situated below the transverse center line 18. The air/oil inlet and outlet 25 extends in both the upper part 17 and the lower part 19.

The plate 20 is connected to an air distribution member 30, that is parallel to the circumferential wall 4 and that has three air inlet openings 31,32, 33. The plate 20 is fixed to an annular front wall surface 36 via the connecting flange 35.

Figure 4:
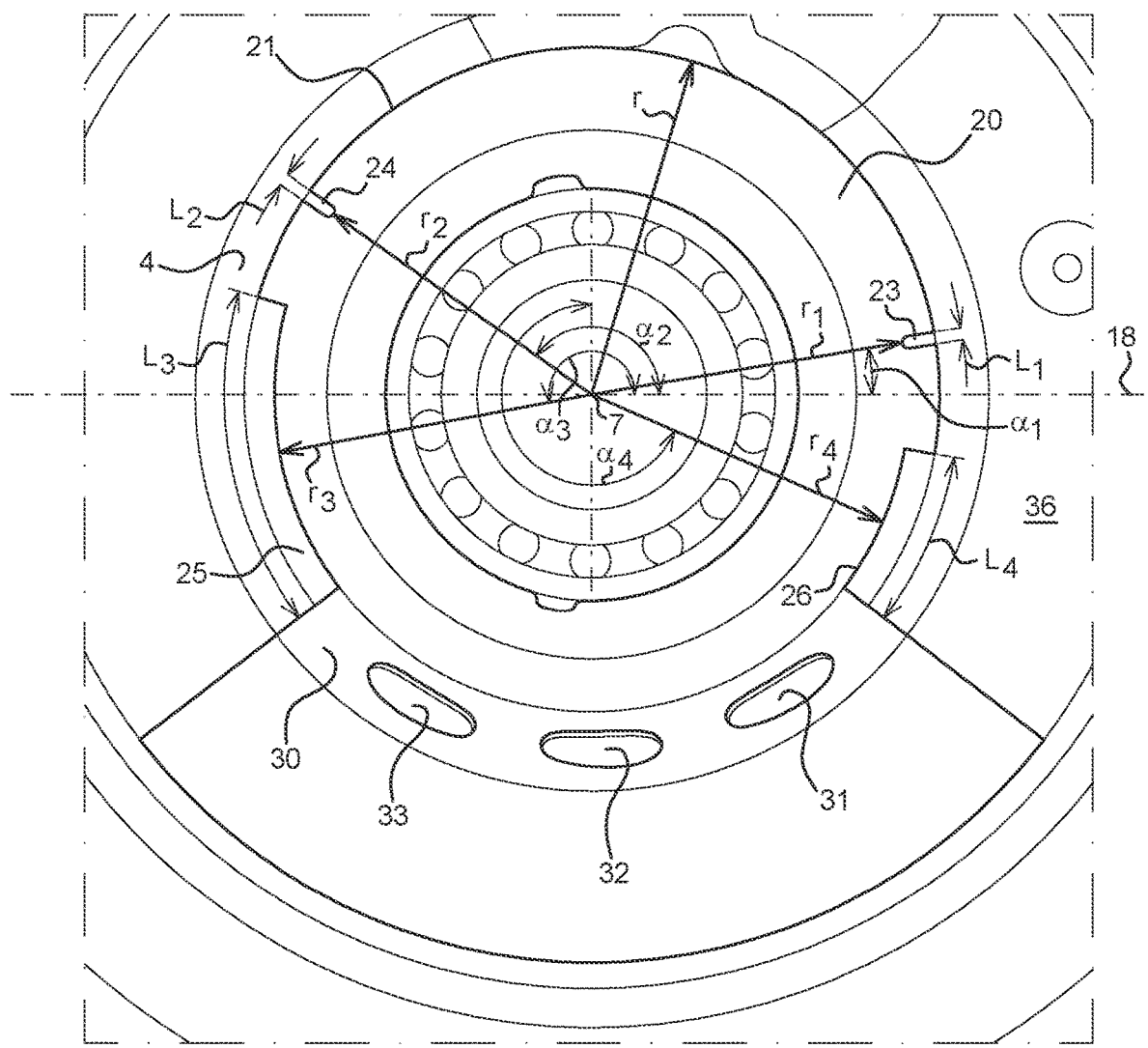
FIG. 4 shows the view of FIG. 3 on an enlarged scale.

FIG. 4 shows the plate 20 on an enlarged scale with the circular perimeter 21 extending at a distance r from the axial center line 7. The distance r of the perimeter 21 is for instance 10-20 cm. The air inlet 23 is provided at an angle $\alpha_1$ of about 10° and has a length $l_1$ of for instance 3 mm. The air inlet 24 is provided at an angle $\alpha_2$ of 145° and may have a length $l_2$ 3 mm. The air/oil inlet and outlet 25 is provided at an angle $\alpha_3$ of 190° and may have a length $l_3$ of 6.5 cm. The air/oil inlet and outlet 26 is provided at an angle $\alpha_4$ of 340° and may have a length $l_4$ of 3 cm. The distances $r_1$-$r_4$ of the bottom of the recesses in the perimeter 21 that form the inlets and outlets 23-26 may be for instance 0.5 cm smaller that the distance r of the perimeter 21.

The invention claimed is:

1. A transmission gear assembly, comprising:
    a housing with an axial center line, the housing having a circumferential wall extending in an axial direction, and
    an end wall at a motor side and a front wall at an output side, the end wall and the front wall extending in a radial direction, the walls defining an oil reservoir having an upper part and a lower part,
    an opening being provided in the end wall for receiving an input shaft,
    a gear system being rotatably mounted in the housing and connectable to the input shaft,
    an opening being provided in the front wall for receiving an output shaft that is connectable to the gear system,
    a breather opening being provided in the circumferential wall, and
    the front wall comprising an annular groove that is in fluid communication with the breather opening at an upper side of the front wall, the annular groove being covered by a substantially circular plate having a perimeter at a first distance (r) from the axial center line and with a predetermined length (L), the perimeter extending near the circumferential wall, with on each transverse side of the axial center line in at least the lower part an air/oil inlet and outlet defined by a recess of the perimeter at a distance ($r_3$,$r_4$) from the axial center line that is smaller than the first distance r, each recess having a circumferential length ($l_3$,$l_4$) and being in fluid communication with the annular groove, and with on each transverse side of the axial center line in the upper part an air/oil inlet is defined by a recess of the perimeter at a distance ($r_1$,$r_2$) from the axial center line that is smaller than the first distance (r) and having a circumferential length ($l_1$,$l_2$) that is shorter than the circumferential length ($l_3$,$l_4$) of the inlet/outlets.

2. The transmission gear assembly according to claim 1, an air distribution member having air inlet openings, being situated along the circumferential wall in the lower part of the oil reservoir.

3. The transmission gear assembly according to claim 2, the air distribution member being attached to the perimeter of the plate, along a lower side.

4. The transmission gear assembly according to claim 1, wherein:
    a first inlet is situated with a midpoint at an angular position of between 35 and 55 degrees and has a length $l_1$ of between 1% and 5% of the length (L) of the perimeter,
    a second inlet is situated with a midpoint at an angular position of between 130 and 150 degrees and has a length ($l_2$) of between 1% and 5% of the length (L) of the perimeter,
    a first inlet/outlet is situated with a midpoint at an angular position of between 210 and 230 degrees and has a length ($l_3$) between 10% and 25% of the length (L) of the perimeter, and
    a second inlet/outlet is situated with a midpoint at an angular position of between 305 and 325 degrees, and has a length ($l_4$) between 5% and 20% of the length (L) of the perimeter.

5. The transmission gear assembly according to claim 1, further comprising a planetary gear system.

6. The transmission gear assembly according to claim 1, further comprising an electric motor assembly with an output shaft connected to the transmission gear assembly, the output shaft of the electric motor assembly being situated on the axial center line.

7. An electric vehicle, comprising:
    an electric motor assembly with an output shaft, and
    a transmission gear assembly connected to the output shaft of the electric motor assembly, the transmission gear assembly comprising:
        a housing with an axial center line, the housing having a circumferential wall extending in an axial direction, and
        an end wall at a motor side and a front wall at an output side, the end wall and the front wall extending in a radial direction, the walls defining an oil reservoir having an upper part and a lower part, an opening being provided in the end wall for receiving an input shaft, a gear system being rotatably mounted in the housing and connectable to the input shaft, an opening being provided in the front wall for receiving an output shaft that is connectable to the gear system, a breather opening being provided in the circumferential wall, and the front wall comprising an annular groove that is in fluid communication with the breather opening at an upper side of the front wall, the annular groove being covered by a substantially circular plate having a perimeter at a first distance (r) from the axial center line and with a predetermined length (L), the perimeter extending near the circumferential wall, with on each transverse side of the axial center line in at least the lower part an air/oil inlet and outlet defined by a recess of the perimeter at a distance $(r_3, r_4)$ from the axial center line that is smaller than the first distance r, each recess having a circumferential length $(l_3, l_4)$ and being in fluid communication with the annular groove, and with on each transverse side of the axial center line in the upper part an air/oil inlet is defined by a recess of the perimeter at a distance $(r_1, r_2)$ from the axial center line that is smaller than the first distance (r) and having a circumferential length $(l_1, l_2)$ that is shorter than the circumferential length $(l_3, l_4)$ of the inlet/outlets.

8. The electric vehicle according to claim 7, an air distribution member having air inlet openings, being situated along the circumferential wall in the lower part of the oil reservoir.

9. The electric vehicle according to claim 8, the air distribution member being attached to the perimeter of the plate, along a lower side.

10. The electric vehicle according to claim 7, wherein:

a first inlet is situated with a midpoint at an angular position of between 35 and 55 degrees and has a length $l_1$ of between 1% and 5% of the length (L) of the perimeter, a second inlet is situated with a midpoint at an angular position of between 130 and 150 degrees and has a length $(l_2)$ of between 1% and 5% of the length (L) of the perimeter, a first inlet/outlet is situated with a midpoint at an angular position of between 210 and 230 degrees and has a length $(l_3)$ between 10% and 25% of the length (L) of the perimeter, and a second inlet/outlet is situated with a midpoint at an angular position of between 305 and 325 degrees, and has a length $(l_4)$ between 5% and 20% of the length (L) of the perimeter.

11. The electric vehicle according to claim 7, further comprising a planetary gear system.

12. The electric vehicle according to claim 7, the output shaft of the electric motor assembly being situated on the axial center line.

* * * * *